(12) United States Patent
Maloney (10) Patent No.: US 9,242,320 B2
(45) Date of Patent: Jan. 26, 2016

(54) TACK PIN INSTALLATION PRESS

(75) Inventor: Michael J. Maloney, Doylestown, PA (US)

(73) Assignee: PEM Management, Inc., Wilmington, DE (US)

( * ) Notice: Subject to any disclaimer, the term of this patent is extended or adjusted under 35 U.S.C. 154(b) by 667 days.

(21) Appl. No.: 13/600,890

(22) Filed: Aug. 31, 2012

(65) Prior Publication Data

US 2013/0056514 A1 Mar. 7, 2013

Related U.S. Application Data

(60) Provisional application No. 61/530,555, filed on Sep. 2, 2011.

(51) Int. Cl.
| | |
|---|---|
| *A43D 69/12* | (2006.01) |
| *B27F 7/00* | (2006.01) |
| *B23P 19/00* | (2006.01) |
| *B23P 19/06* | (2006.01) |
| *B21J 15/32* | (2006.01) |

(52) U.S. Cl.
CPC .............. *B23P 19/001* (2013.01); *B21J 15/323* (2013.01); *B23P 19/062* (2013.01)

(58) Field of Classification Search
CPC ....................................................... B23P 19/04
USPC ................. 227/90–98, 175.1–182.1
See application file for complete search history.

(56) References Cited

U.S. PATENT DOCUMENTS

| | | | |
|---|---|---|---|
| 229,442 A | 6/1880 | McKay | |
| 1,674,437 A | 6/1928 | Hubbard | |
| 2,216,403 A | 10/1940 | Oeckl et al. | |
| 2,327,401 A | 8/1943 | Chilton | |
| 2,701,360 A | 2/1955 | Lang | |
| 3,705,446 A * | 12/1972 | Gustavsson | 29/34 A |
| 3,903,582 A | 9/1975 | Sweeney et al. | |
| 4,033,499 A * | 7/1977 | Butler | 227/120 |
| 5,129,467 A * | 7/1992 | Watanabe et al. | 173/75 |
| 5,542,323 A * | 8/1996 | Habermehl et al. | 81/434 |
| 6,012,215 A | 1/2000 | DeMoura | |
| 7,344,058 B2 * | 3/2008 | Bruins et al. | 227/18 |

(Continued)

FOREIGN PATENT DOCUMENTS

WO 2011058297 A1 5/2011

OTHER PUBLICATIONS

SIPO Office action for application No. 201280053965.6, dated Mar. 27, 2015.

*Primary Examiner* — Robert Long (74) *Attorney, Agent, or Firm* — Ryder, Lu, Mazzeo & Konieczny, LLC; Joseph M. Konieczny, Sr.; Gregory J. Gore (57) ABSTRACT

An automated press feeds a string of tack pins loaded on a reel. The press shears the part from the string of fasteners and delivers each part individually to a punch for installation. The string of fasteners is pulled from the reel by a sprocket which includes peripheral teeth for engaging the fasteners and for feeding them in a vertical column to a shear station. A horizontally reciprocal shear block severs individual fasteners one-at-a-time from the end of the fastener string at the shear station, each fastener being indexed to the next shear position by incremental rotation of the sprocket. The punch includes vacuum retaining means for lifting each fastener from the shear block.

8 Claims, 8 Drawing Sheets

(56) References Cited

U.S. PATENT DOCUMENTS

| | | |
|---|---|---|
| 2002/0152596 A1 | 10/2002 | Ruddy et al. |
| 2002/0179672 A1* | 12/2002 | Flannery et al. ................. 227/67 |
| 2005/0247751 A1* | 11/2005 | Wywialowski ......... B25C 1/184 |
| | | 227/136 |
| 2006/0075618 A1 | 4/2006 | Waidelich et al. |
| 2007/0057010 A1* | 3/2007 | Byrne ........................... 227/133 |
| 2007/0114259 A1* | 5/2007 | Bromley et al. ............... 227/120 |
| 2010/0258608 A1 | 10/2010 | Porth et al. |
| 2010/0320251 A1* | 12/2010 | Leitner ......................... 227/113 |
| 2012/0248171 A1* | 10/2012 | Bailly et al. ................ 227/176.1 |
| 2013/0034408 A1* | 2/2013 | Maloney ....................... 411/445 |

\* cited by examiner

TACK PIN INSTALLATION PRESS

RELATED APPLICATION

This patent application is a non-provisional of provisional patent application Ser. No. 61/530,555 entitled "Tack Pin Installation Press" filed on Sep. 2, 2011, priority from which is hereby claimed.

FIELD OF THE INVENTION

The present invention relates to a fastener installation press. More specifically, it relates to a press for installing miniature clinch pins which deform a work piece panel to achieve affixation by clinch attachment and most specifically, it relates to a reel feed automated fastener installation press for such pins.

BACKGROUND OF THE INVENTION

Clinch-type fasteners are well known in the art for securing panels together face-to-face. A displacer on the shank of the pin deforms material of the bottom panel pushing it into an undercut in the shank thus locking the pin into the bottom panel holding the top panel against it by the head of the pin. A head of the fastener abuts the top sheet and retains it against a bottom panel when the fastener is pressed in.

A problem exists however when handling clinch-type tack pins which are in miniature because they are difficult to handle when one attempts to manually place them into position for a press-in attachment process. As tack pins are being designed and used ever smaller, the automatic orientation feeding installation of these parts becomes even more difficult and sometimes impossible with some very small parts. Therefore, there is a need in the art for a automated installation press for installing clinch-type miniature tack pins which is efficient, effective and economical to use.

SUMMARY OF THE INVENTION

Figure 2:
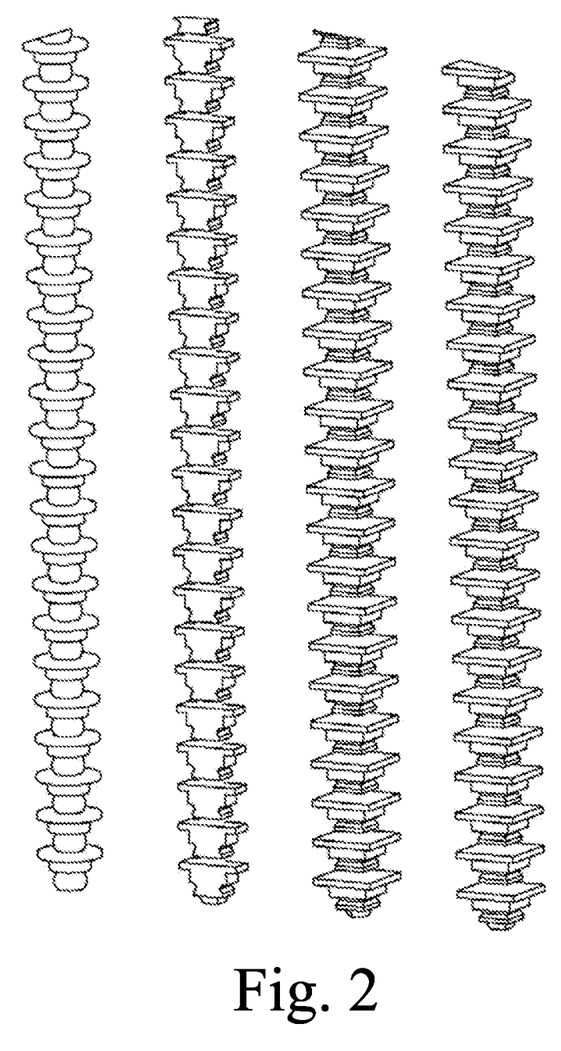
FIG. 2 is a top right front isometric view of continuous strings of different types of fasteners usable with the present invention.

In accordance with one embodiment of the present invention, reeled tack pins are packaged on a standard size reel that can be loaded into an automated press that both shears a part from a string of co-joined fasteners and delivers each part individually to a vacuum or other type of punch for installation. Fasteners manufactured in a continuous string that can be utilized with the present installation press are shown in FIG. 2.

In order to meet the needs in the art, the automated press embodying the invention employs two electrically actuated cylinders and a servo or stepper motor to deliver and install the tack pins. The pins are pulled off the storage reel one at a time by a sprocket driven by a servo or stepper motor. Each part at the end of the string is driven into a shear block. With a part resting in a holding well in the shear block, the shear cylinder actuates, which both shears off a part from the end of the string and delivers the part to the tip of a vacuum punch. The punch then picks the part from the shear block holder, after which the shear cylinder retracts the shear block to accept another pin. With a pin retained on the end of the punch, the punch cylinder actuates to press the part into the assembly waiting below it.

More specifically, one embodiment of the present automated reel feed press comprises a framework having a platform which holds an anvil for supporting a work piece. The framework also holds a punch located in axial alignment above the anvil and is reciprocal between retracted and extended positions. The press further includes a fastener feeding mechanism for delivering a plurality of fasteners one at a time to a position between the punch and the anvil. The feeding mechanism comprises a reel holding an elongate string of co-joined fasteners wound about the reel, the fasteners being contiguously connected toe-to-head thus forming the string. The individual fasteners are severable from the string at junctions between each fastener. The string of fasteners is pulled from the reel by a sprocket which includes peripheral teeth for engaging the fasteners and for feeding them in a vertical column to a shearing station. A reciprocal shear block severs individual fasteners one at a time from a delivery end of the fastener string, each fastener being indexed into the next shear position by incremental rotation of the sprocket. The shear block includes a well for holding each fastener and is reciprocal from a shear position to a delivery position in the axial path of the punch. The punch includes vacuum retaining means for lifting each fastener from the shear block. After the shear block retracts, the punch then extends downward and forcibly drives the fastener into the work piece.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention.

DESCRIPTION OF THE PREFERRED EMBODIMENT

Figure 1:
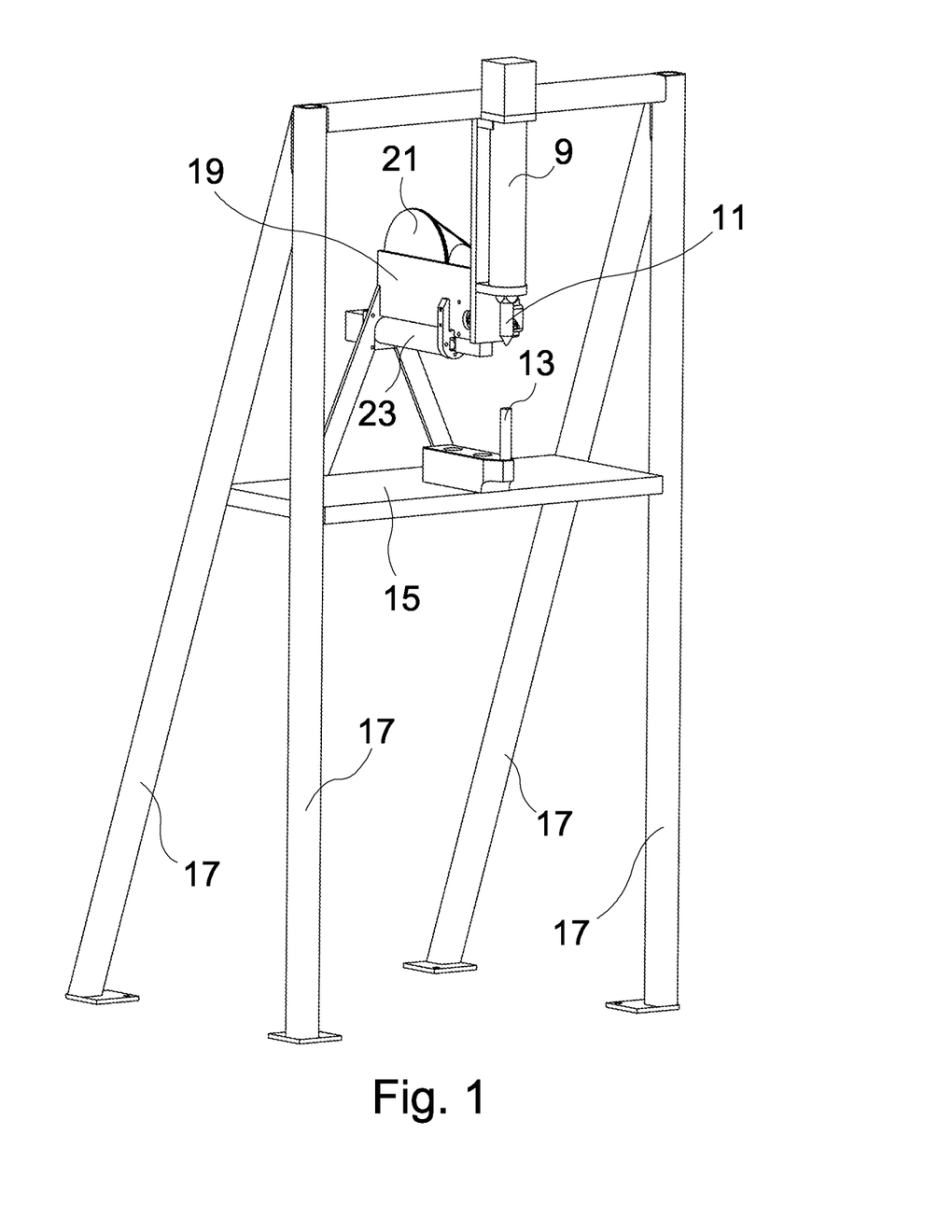
FIG. 1 is a top left front isometric view of the pin reel auto-feed press of the invention.

Referring now to FIG. 1, the pin reel auto-feed press of the invention is shown. The basic components of the invention include a punch mechanism with a driving cylinder 9 and a punch 11 with a vacuum tip. The punch is located directly above in an axial alignment with anvil 13. The anvil is supported on a platform 15 that is carried by framework members 17 which form the legs of a stand for supporting the components of the press. As will be further described herein, the press comprises a delivery feed mechanism 19 that includes a reel 21 and a horizontally reciprocal shear block 23 assembly.

FIG. 2 shows four different types of fasteners manufactured in continuous strings of tack pins. Each string is composed of individual fasteners joined toe-to-head with severable joints between each fastener. In this way, the fastener delivery system requires no carrier medium and creates no scrap.

Figure 3:
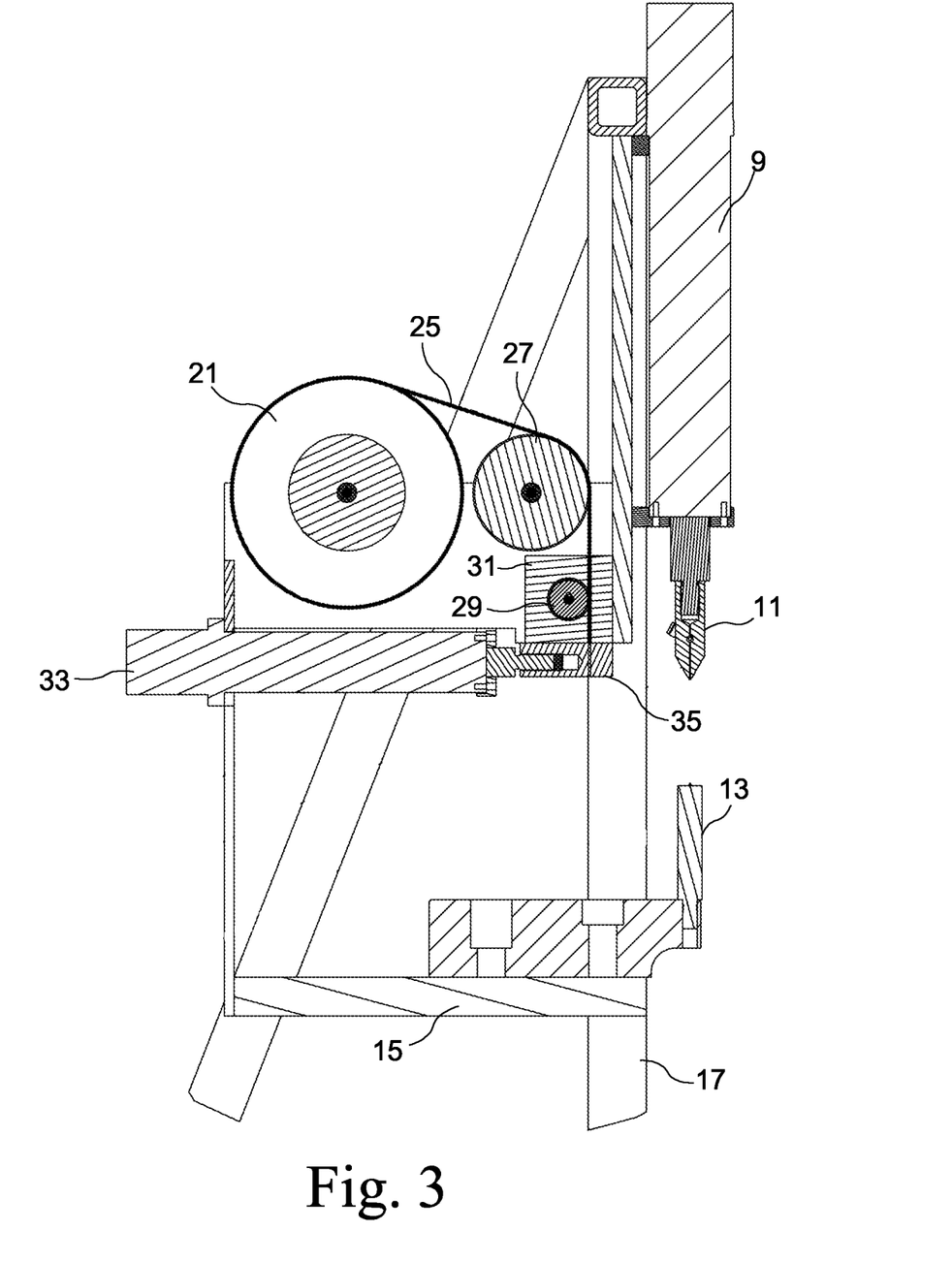
FIG. 3 is a left side elevation sectional view thereof.
Figure 4:
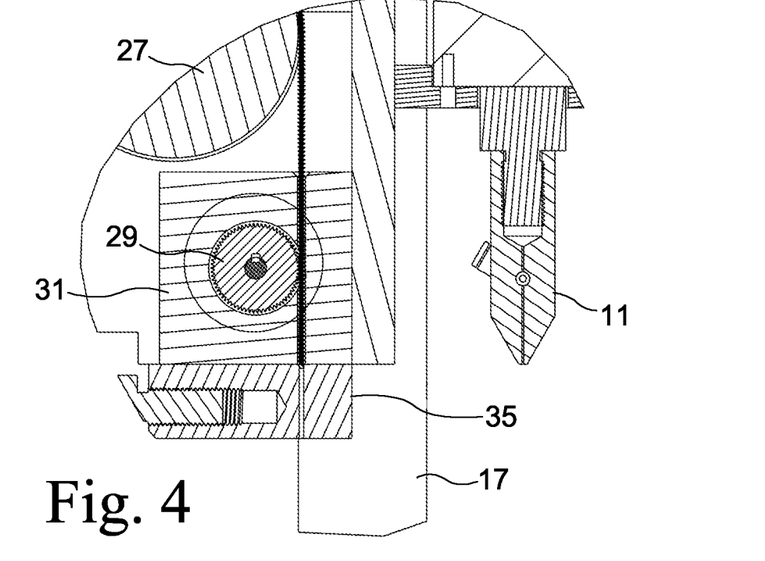
FIG. 4 is a partial cutaway left side elevation sectional view.

Referring now to FIGS. 3 and 4, the press is depicted in cross-section. The pin storage reel 21 supports an elongate string of fastener pins wound about it. An idler wheel 27 directs the string 25 into vertical alignment directly above the edge of feed sprocket 29. The feed sprocket cooperates with a feed plate 31 that has a bore which holds the fastener string in a vertical linear column and in engagement with teeth on the feed sprocket. A shear cylinder 33 moves the shear block 35 in reciprocal motion horizontally from a shear position directly beneath the columnated string to a position in the axial path of a vacuum punch 11 at the top of its stroke. The punch is reciprocally moved up and down above the anvil by the punch cylinder 9. This arrangement of structures is depicted more closely in FIG. 4. The fasteners are incrementally driven into a holder of the shear block by the sprocket 29. The holder provides a stop to the advancement of the fastener string and ensures precise shearing location of each fastener as it is delivered to the shear station.

Figure 5:
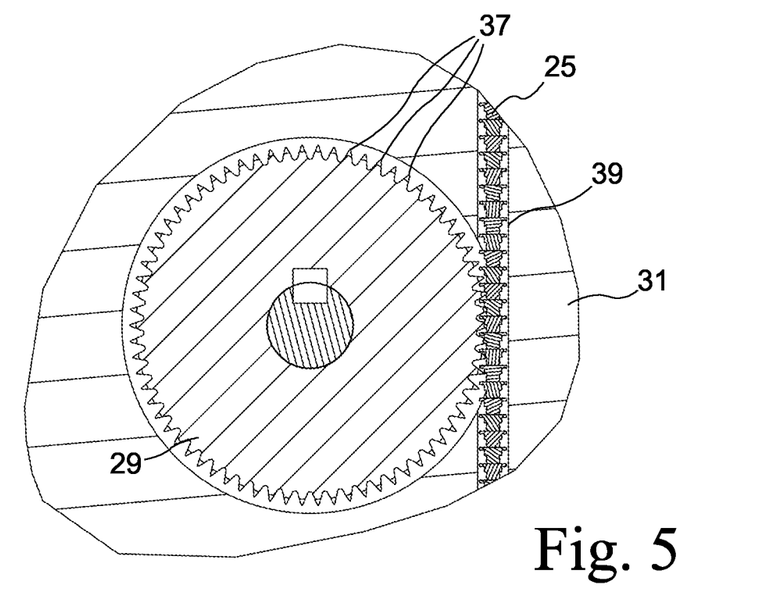
FIG. 5 is an enlarged view of a portion of the sectional view shown in FIG. 4.
Figure 6:
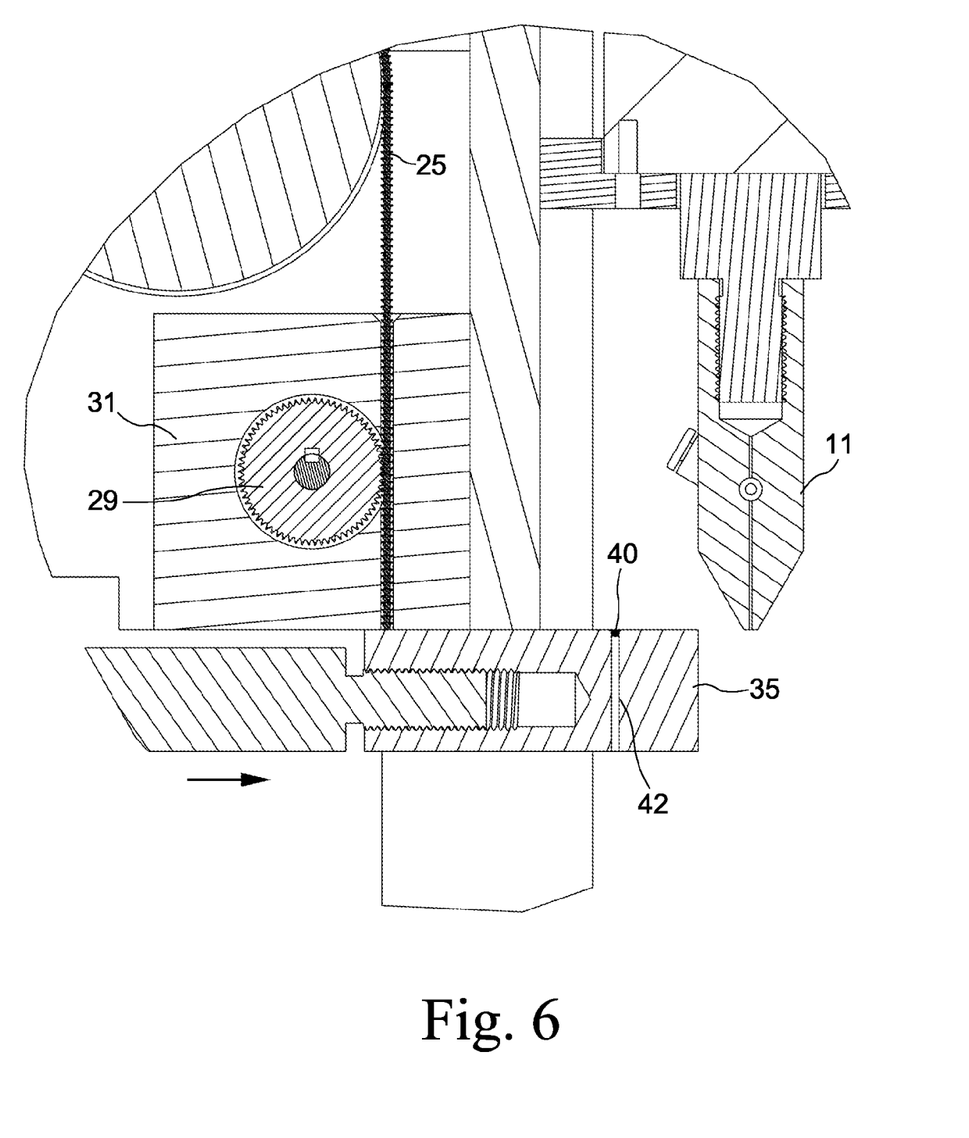
FIGS. 6, 7, 8 and 9 are partial cutaway left side sectioned elevation views showing the operational sequence of the auto-feed press of the invention.

Referring now to FIG. 5, the sprocket 29 engages the edges of the fasteners between peripheral teeth 37 on the sprocket. The individual fasteners are moved to the shear station at a shear position shown in FIG. 4 of the holder well in the shear block by the incremental advancement of the rotating sprocket 29. Bore 39 in feed plate 31 holds the fastener string against the sprocket and in a vertical column directly above the shear block holder at its retracted position.

Figure 7:
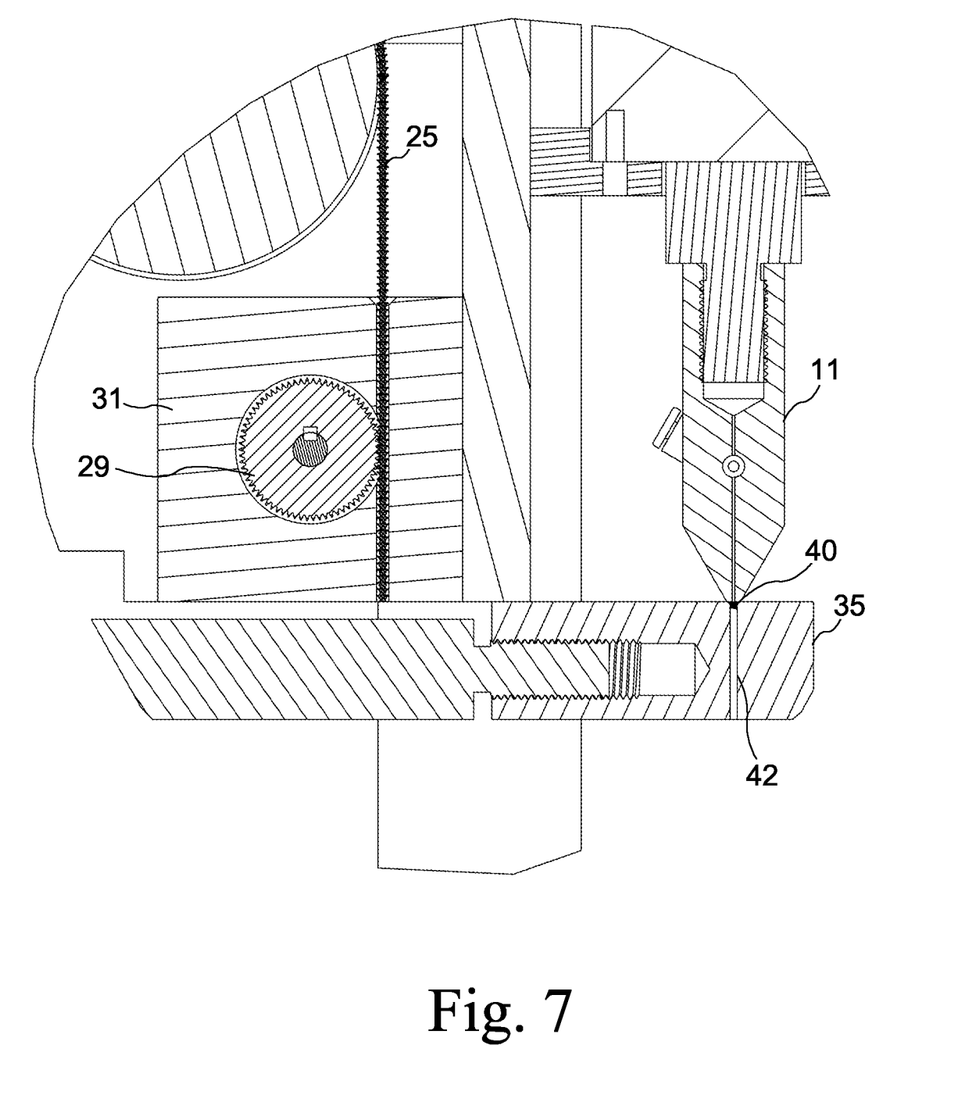
Figure 8:
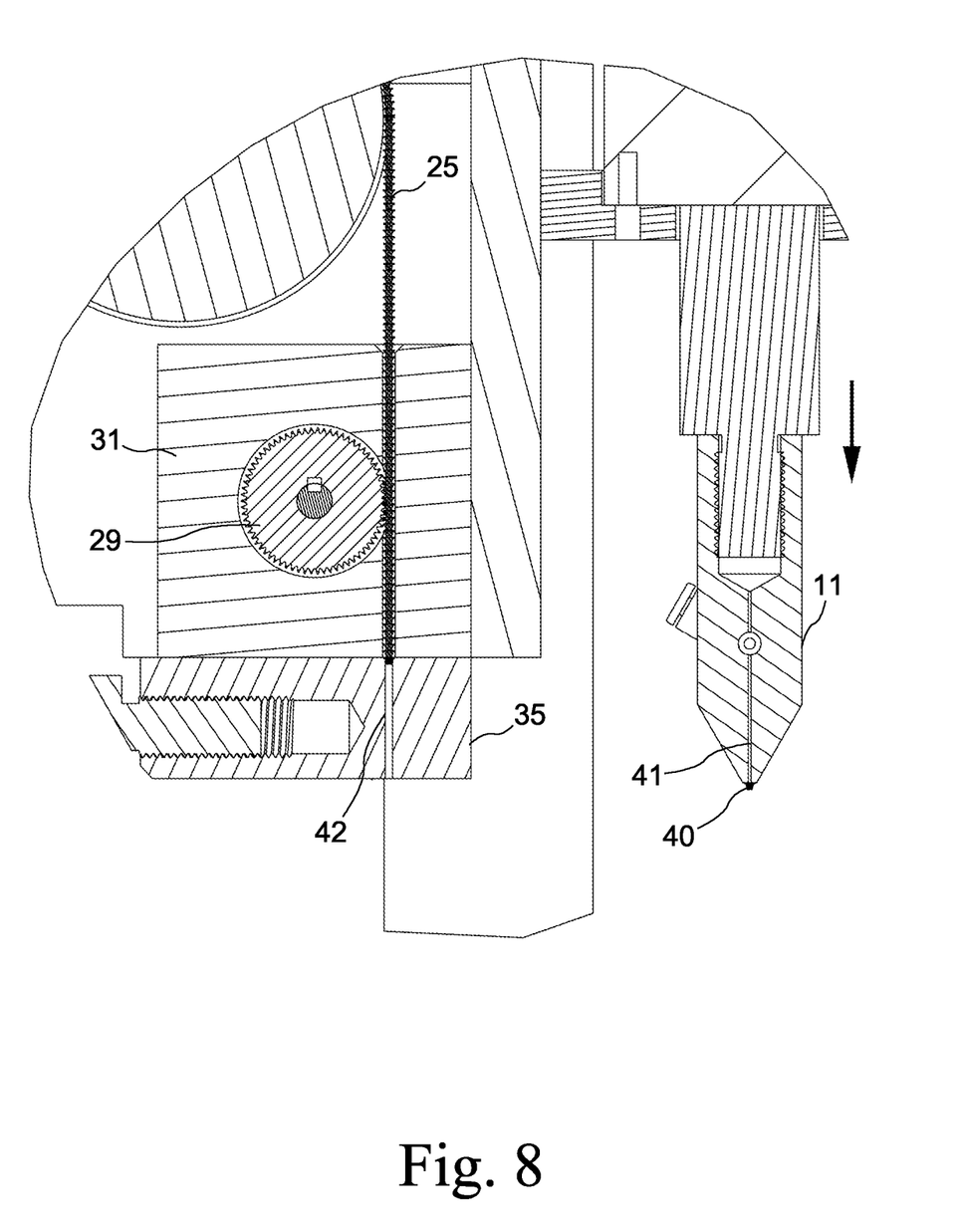
Figure 9:
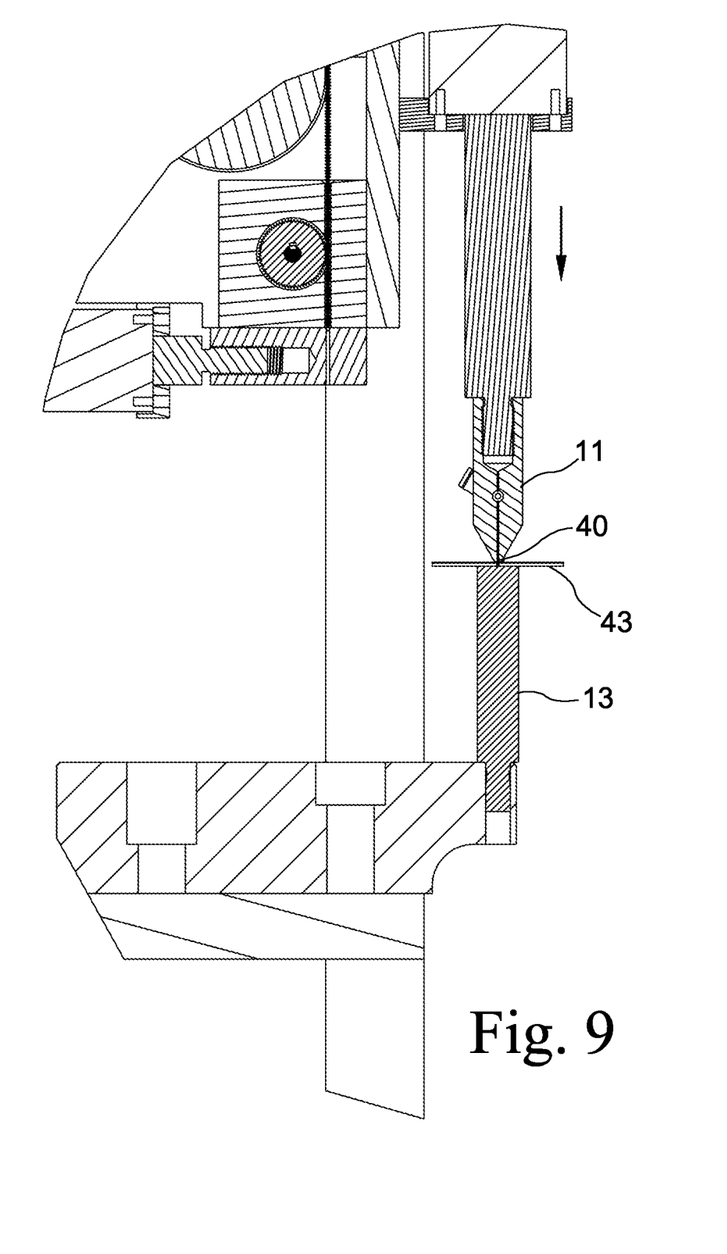

As sequentially shown in FIGS. 6-9 following the numbering of like elements in the previous figures of drawing, individual fasteners 40 are carried from the shear position shown in FIG. 4 by the shear block 35 to a delivery position adjacent a tip of the vacuum punch 11 as shown in FIG. 7. By the aerodynamic force of the vacuum punch 11 provided by drawing a vacuum through air conduit 41 and retraction of the punch, each sheared fastener 40 is lifted from the holding well 42 in the shear block and retained on the tip of the punch. The shear block is then retracted to the shear station 38 to receive the next fastener from the end of the fastener string 25 as shown in FIG. 8. As shown in FIG. 9, the punch then is moved downward so that the fastener is forcibly driven into work pieces 43 positioned against the anvil 13. The work pieces being assembled are positioned by an X/Y table (not shown) from installation hole to installation hole as each pin is installed.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automated reel feed press comprising:
   a frame having a platform which includes an anvil for supporting one or more work pieces;
   a punch mechanism affixed to said frame including a punch reciprocal between retracted and extended positions being located directly above said anvil;
   a feeding mechanism for delivering a plurality of fasteners one at a time to a delivery position between said punch and said anvil comprising:
      a reel holding a plurality of fasteners wound about the reel, said fasteners being contiguously joined at severable joints between each fastener to form a string of fasteners; and
      a sprocket adapted for pulling said string of fasteners from said reel and for delivering them incrementally to a shear station;
   a reciprocating shear block at the shear station for severing individual fasteners one at a time from an end of said fastener string; and
   the reciprocating shear block including a fastener holder for retaining and delivering each of said severed fasteners to said punch wherein said punch includes a tip having means for lifting said severed fastener from said holder and further including means for retaining said fastener on said tip.

2. The press of claim 1 wherein said shear block fastener holder reciprocates horizontally between the shear station and the punch delivery position beneath the retracted position of said punch tip.

3. The press of claim 2 wherein said fastener holder is a well in said shear block.

4. The press of claim 3 further including a feed plate located between said sprocket and said shear station, said feed plate including a bore adapted to hold said string of fasteners in a vertical column directly above the shear station.

5. The feed press of claim 4 wherein the sprocket engages edges of the fasteners between teeth of the sprocket.

6. The press of claim 5 wherein said retaining means of said punch tip is an air conduit for drawing a vacuum upon each sheared fastener.

7. The press of claim 6 wherein said holder well of the shear block captures and shears off individual fasteners from said string of fasteners before delivering each fastener to the punch delivery position.

8. The press of claim 1 wherein said string of fasteners comprises a plurality of individual fasteners joined toe-to-head.

* * * * *